Patented Feb. 24, 1953

2,629,667

UNITED STATES PATENT OFFICE 2,629,667

RETARDED SET CEMENT AND SLURRIES THEREOF

Herman Henry Kaveler, Bartlesville, Okla., assignor to Phillips Petroleum Company, a corporation of Delaware No Drawing. Application December 27, 1949, Serial No. 135,313

20 Claims. (Cl. 106—93)

This invention relates to cements having retarded rates of set, or thickening time. In one respect it relates to aqueous slurries of such cement. In one aspect it relates to methods of making these slurries. This application is a continuation-in-part of U. S. Patent application Serial No. 47,555, filed September 2, 1948. In another aspect it relates to retarded set cement slurries comprising hydraulic cement, such as Portland cement, with or without non-cementing inert granular aggregate material, which hydraulic cement may or may not contain the usual minor additives common to hydraulic cements such as calcium sulfate and/or calcium chloride as an example in the usual amounts, a small but effective amount of a set retarding agent comprising essentially alkyl hydroxyalkyl cellulose mixed ethers where the alkyl group contains 1 to 4 carbon atoms and the hydroxyalkyl group contains 2 to 4 carbon atoms, and sufficient water to make a slurry.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it upward around the outer surface of the casing or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within about 24 hours.

I have found that by adding a small but effective amount of alkyl hydroxyalkyl cellulose mixed ethers where the alkyl group contains 1 to 4 carbon atoms and the hydroxyalkyl group contains 2 to 4 carbon atoms in the amount of 0.05% to 5% but preferably about 1% based on the weight of dry cement and preferably using ordinary commercial Portland cement containing the usual additives, along with sufficient water to make a slurry, that the water loss as determined by filtration tests is greatly reduced and contamination of the formation is substantially prevented.

One object of the present invention is to provide an improved cement slurry useful in grouting in general, in cementing the walls of wells, and for cementing pipe in wells.

Another object is to provide a retarded set cement.

Another object is to provide a cement slurry having a high compressive strength suitable for use in oil well cementing operations.

Numerous other objects and advantages will be apparent upon reading the accompanying specification and claims.

In preparing the slurry the dry ingredients comprising hydraulic cement, with or without the usual additives, the inert filler material, such as sand or crushed limestone, and the alkyl hydroxyalkyl cellulose mixed ethers where the alkyl group contains 1 to 4 carbon atoms and the hydroxyalkyl group contains 2 to 4 carbon atoms may be mixed together and later mixed with water, or any of them may be mixed separately with water, and then mixed together to form the cement slurry, as long as the mixing of the hydraulic cement with water is done promptly before placing the slurry in position.

By hydraulic cement I intend to include all mixtures of lime, silica, and alumina, or of lime and magnesia, silica, and alumina and iron oxide (magnesia for example may replace part of the lime, and iron oxide a part of the alumina) as are commonly known as hydraulic cements. Hydraulic cements include hydraulic lines, grappier cements, puzzalan cements, natural cements, and Portland cements. Puzzalan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements.

In most oil well cementing and grouting operations it is generally desirable to use neat cement for added strength, but obviously it is always possible to add any desired amount of an inert granular filling material or aggregate such as sand, ground limestone, or any of the other well known inert aggregates, as long as the amount added does not reduce the strength below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical, it being obvious that sufficient water should be added to form a pumpable slurry, and that when the slurry becomes pumpable no further water need be added. One advantage of the slurry of the present invention is that it is a low viscosity, retarded set slurry. Another advantage is its increased compressive strength.

For the purpose of illustrating the material with a formula, cellulose may be regarded as consisting of a number of glucoside residues X, each having three hydroxyl radicals —OH thereon. The residue X is repeated a large number of times, represented by $n$, which may be 100 or more. Most of the OH radicals are unchanged, but a desired number of them are substituted. There can be from one to three substitutions on each glucoside residue as there are three hydroxyl groups thereon. I prefer a substitution of alkyl groups for the hydrogen of these three hydroxyl groups between 0.05 and 2.25 and more preferably from 0.1 to 1.75 per glucoside residue unit as an average substitution. These two preferred ranges of substitution are similarly preferred for the average amount of substitution of the hydroxyalkyl groups for the hydrogen groups in the glucoside units of the cellulose, but obviously the sum of the two substitutions must be less than a total of three. Alkyl groups, such as methyl groups, attached to cellulose tend to make it water soluble while the hydroxyalkyl groups have great dispersive powers in addition, and it is believed the combination of these two functions of these alkyl and hydroxyalkyl groups when both are attached to the cellulose makes superior cement slurry set retarding agent than if only one group were present. The alkyl radical —$C_mH_{2m+1}$ where $m$ is an integer from 1 to 4, inclusive, replaces some of the hydrogen atoms in the —OH radicals of the celluloses and the hydroxyalkyl radical —$C_yH_{2y}OH$ where $y$ is an integer from 2 to 4, inclusive, replaces the hydrogen in other of the —OH radicals, not necessarily attached to the same residue X, but to some residue X of the same cellulose molecule, to the desired extent. The formula therefore is represented as follows:

$$\left[ X \begin{array}{l} O-C_mH_{2m+1} \\ O-C_yH_{2y}OH \\ OH \end{array} \right]_n$$

In the case of the preferred material, methyl hydroxyethyl cellulose this would be:

$$\left[ X \begin{array}{l} O-CH_3 \\ O-CH_2CH_2OH \\ OH \end{array} \right]_n$$

The compounds covered are methyl, ethyl or propyl, hydroxyethyl, hydroxypropyl or hydroxybutyl cellulose mixed ethers.

The preparation of methyl hydroxyethyl cellulose was made in the following manner:

Alkali cellulose was prepared by adding 1 liter of 32% sodium hydroxide solution to 100 grams of Chem-Cotton and allowing the cotton to mercerize for 2 hours. The excess liquid was removed in a bucket centrifugal filter. The alkali cellulose was then air dried. The dry alkali cellulose was charged to a one liter stainless steel bomb. The bomb was evacuated to 20 mm. then brought to atmospheric pressure with methyl chloride. The bomb was re-evacuated to 40 mm. pressure and 13 grams of ethylene oxide were added at 69° F. The pressure increased then reduced to 640 mm. This was allowed to stand overnight. Methyl chloride was added to bring the gage pressure to 60 pounds per square inch. The bomb was heated to 176° F. and the temperature maintained essentially constant ($\pm 5°$ F). Additional methyl chloride was added when the pressure dropped to 40 pounds per square inch gage. No pressure drop was obtained after four hours and reactions were presumed to be complete.

The crude methyl hydroxyethyl cellulose, a light brown powder was purified by three successive acetone precipitations of water solutions of the cellulose derivative. A total of 110 grams of purified methyl hydroxyethyl cellulose were recovered. The viscosity of a 1% aqueous solution was 1 cps. at 20° C. and the pH was 12.5.

Methyl bromide, ethyl and propyl chloride or bromide and butyl bromide may be employed in the above procedure in place of the methyl chloride to attach the corresponding alkyl groups to the cellulose, while halogen hydrins of polyalcohols may be employed in place of the ethylene oxide to form the corresponding hydroxyalkyl celluloses. Glycol chlorohydrin reacts with alkali cellulose to form hydroxyethyl cellulose and glycerol a-monochlorohydrin reacts to form dihydroxypropyl cellulose, and higher hydroxyalkyl celluloses are similarly prepared.

I have found that from 0.05% to 5% of alkyl hydroxyalkyl cellulose mixed ethers where the alkyl group contains 1 to 4 carbon atoms and the hydroxyalkyl group contains 2 to 4 carbon atoms are particularly effective in increasing the time of set of hydraulic cement aqueous slurries, with or without inert filling material present.

A Portland cement slurry was made up weighing fifteen pounds to the gallon of slurry (about 53 grams of water per 100 grams of cement), and 1% of methyl hydroxyethyl cellulose mixed ether by weight (based on the dry Portland cement) was added to one-half of the sample. The two halves of the sample were tested separately according to the test procedure for drilling muds described in A. P. I. code 29 and for cements in A. P. I. code 32 (time of set with Vicat apparatus under section X). The results of the tests are tabulated as follows:

*Table*

| Name of Additive | Weight Percent of Additive to Dry Cement | Time to Reach Initial Set | Compressive Strength (p. s. i.) | Water Loss (ml.) |
|---|---|---|---|---|
| None | 0 | *Hours* 4.4 | 1,856 | 105 in 1 min. |
| MHEC [1] | 1 | 22 to 24 | 2,004 | 15 sec. 106 in 7 min. |

[1] Methyl hydroxyethyl cellulose mixed ether.

The methyl, ethyl, propyl and butyl radicals are substantially equivalent in these mixed ethers and all give beneficial results. It is also obvious that inert filling material will not substantially affect the result of this test, when used in an amount not large enough to deleteriously reduce the strength of the cement slurry after setting.

The above tests are given for illustrative purposes and should not be regarded as limiting the invention, the scope of which is set forth in the following claims.

Having described my invention, I claim:

1. A cement capable of forming a fluid slurry when mixed with water, said cement comprising a hydraulic cement mixed with a minor proportion of at least one of the group consisting of alkyl hydroxyalkyl cellulose mixed ethers where the alkyl group contains 1 to 4 carbon atoms and the hydroxyalkyl group contains 2 to 4 carbon atoms.

2. A cement capable of forming a fluid slurry when mixed with water, said cement comprising Portland cement mixed with a minor proportion of at least one of the group consisting of alkyl hydroxyalkyl cellulose mixed ethers where the alkyl group contains 1 to 4 carbon atoms and the hydroxyalkyl group contains 2 to 4 carbon atoms.

3. A hydraulic cement slurry comprising a hydraulic cement, water, and a minor proportion of at least one of the group consisting of alkyl hydroxyalkyl cellulose mixed ethers where the alkyl group contains 1 to 4 carbon atoms and the hydroxyalkyl group contains 2 to 4 carbon atoms.

4. A hydraulic cement slurry comprising Portland cement, water, and a minor proportion of at least one of the group consisting of alkyl hydroxyalkyl cellulose mixed ethers where the alkyl group contains 1 to 4 carbon atoms and the hydroxyalkyl group contains 2 to 4 carbon atoms.

5. A cement capable of forming a fluid slurry when mixed with water, said cement comprising a hydraulic cement mixed with a minor proportion of methyl hydroxyethyl cellulose mixed ether.

6. A cement capable of forming a fluid slurry when mixed with water, said cement comprising Portland cement mixed with a minor proportion of methyl hydroxyethyl cellulose mixed ether.

7. A hydraulic cement slurry comprising a hydraulic cement, water and a minor proportion of methyl hydroxyethyl cellulose mixed ether.

8. A hydraulic cement slurry comprising Portland cement, water, and a minor proportion of methyl hydroxyethyl cellulose mixed ether.

9. A cement capable of forming a fluid slurry when mixed with water, said cement comprising a hydraulic cement mixed with from 0.05% to 5% by weight of dry cement of at least one of the group consisting of alkyl hydroxyalkyl cellulose mixed ethers where the alkyl group contains 1 to 4 carbon atoms and the hydroxyalkyl group contains 2 to 4 carbon atoms.

10. A cement capable of forming a fluid slurry when mixed with water, said cement comprising Portland cement mixed with from 0.05% to 5% by weight of dry cement of at least one of the group consisting of alkyl hydroxyalkyl cellulose mixed ethers where the alkyl group contains 1 to 4 carbon atoms and the hydroxyalkyl group contains 2 to 4 carbon atoms.

11. A hydraulic cement slurry comprising a hydraulic cement, water, and from 0.05% to 5% by weight of dry cement of at least one of the group consisting of alkyl hydroxyalkyl cellulose mixed ethers where the alkyl group contains 1 to 4 carbon atoms and the hydroxyalkyl group contains 2 to 4 carbon atoms.

12. A hydraulic cement slurry comprising Portland cement, water, and from 0.1% to 3% by weight of dry cement of at least one of the group consisting of alkyl hydroxyalkyl cellulose mixed ethers where the alkyl group contains 1 to 4 carbon atoms and the hydroxyalkyl group contains 2 to 4 carbon atoms.

13. A cement capable of forming a fluid slurry when mixed with water, said cement comprising a hydraulic cement mixed with from 0.05% to 5% by weight of dry cement of methyl hydroxyethyl cellulose mixed ether.

14. A cement capable of forming a fluid slurry when mixed with water, said cement comprising Portland cement mixed with from 0.05% to 5% by weight of dry cement of methyl hydroxyethyl cellulose mixed ether.

15. A hydraulic cement slurry comprising a hydraulic cement, water, and from 0.05% to 5% by weight of dry cement of methyl hydroxyethyl cellulose mixed ether.

16. A hydraulic cement slurry comprising Portland cement, water, and from 0.05% to 5% by weight of dry cement of methyl hydroxyethyl cellulose mixed ether.

17. The process of producing a hydraulic cement aqueous slurry having a reduced water loss to porous formations which comprises admixing with hydraulic cement from 0.1 per cent to 3 per cent by weight of the dry cement of at least one of the group consisting of alkyl hydroxyalkyl cellulose mixed ethers where the alkyl group contains 1 to 4 carbon atoms and the hydroxyalkyl group contains 2 to 4 carbon atoms, which are soluble in the cement slurry, and mixing therewith sufficient water to produce a fluid slurry.

18. The process of producing a hydraulic cement aqueous slurry having a reduced water loss to porous formations which comprises admixing with hydraulic cement a minor proportion effective to reduce the water loss of said slurry of at least one of the group consisting of alkyl hydroxyalkyl cellulose mixed ethers where the alkyl group contains 1 to 4 carbon atoms and the hydroxyalkyl group contains 2 to 4 carbon atoms, which are soluble in said cement slurry, and mixing therewith sufficient water to produce a fluid slurry.

19. The process of producing a hydraulic cement aqueous slurry having a reduced water loss to porous formations which comprises admixing with hydraulic cement from 0.1 per cent to 3 per cent by weight of the dry cement of methyl hydroxyethyl cellulose mixed ether which is soluble in the cement slurry and mixing therewith sufficient water to produce a fluid slurry.

20. The process of producing a hydraulic cement aqueous slurry having a reduced water loss to porous formations which comprises admixing with hydraulic cement a minor proportion effective to reduce said water loss of said slurry of methyl hydroxyethyl cellulose mixed ether which is soluble in the cement slurry and mixing therewith sufficient water to produce a fluid slurry.

HERMAN HENRY KAVELER.

REFERENCES CITED

The following references are of record in the file of this patent:

UNITED STATES PATENTS

| Number | Name | Date |
|---|---|---|
| 2,427,683 | Ludwig | Sept. 23, 1947 |
| 2,432,971 | Ruthman | Dec. 16, 1947 |
| 2,469,353 | Alcorn | May 10, 1949 |
| 2,489,793 | Ludwig | Nov. 29, 1949 |